United States Patent [19]  [11] 4,307,875
Schnitzius et al.  [45] Dec. 29, 1981

[54] SELF-BLOCKING GAS SPRING RELEASED BY EXTERNAL FORCE

[75] Inventors: Klaus Schnitzius, Rheinbrohl; Herbert Freitag, Koblenz-Metternich, both of Fed. Rep. of Germany

[73] Assignee: Stabilus GmbH, Koblenz-Neuendorf, Fed. Rep. of Germany

[21] Appl. No.: 60,232

[22] Filed: Jul. 24, 1979

Related U.S. Application Data

[63] Continuation of Ser. No. 858,155, Dec. 7, 1977, abandoned.

[30] Foreign Application Priority Data

Dec. 30, 1976 [DE] Fed. Rep. of Germany ....... 2659491

[51] Int. Cl.³ .............................. F16F 9/02; F16F 9/06
[52] U.S. Cl. .......................................... 267/120; 16/66; 188/282; 188/288; 267/64.15
[58] Field of Search ................. 267/64 R, 65 R, 120, 267/124; 188/269, 282, 288, 300, 316, 317; 296/56; 16/49, 66, 84

[56] References Cited

U.S. PATENT DOCUMENTS

| 2,920,338 | 1/1960 | Falk | 188/317 |
|---|---|---|---|
| 2,996,754 | 8/1961 | Ziegler et al. | 188/317 |
| 3,143,757 | 8/1964 | Quinn | 188/317 |
| 3,425,522 | 2/1969 | Gryglas | 188/282 |
| 3,833,248 | 9/1974 | Wossuer et al. | 188/282 |
| 3,963,227 | 6/1976 | Molders | 267/120 |
| 3,985,190 | 10/1976 | Kammerer et al. | 188/288 |
| 4,066,279 | 1/1978 | Kaptanis | 267/65 R |
| 4,156,523 | 5/1979 | Bauer | 267/120 |

FOREIGN PATENT DOCUMENTS

| 2457938 | 6/1976 | Fed. Rep. of Germany .... 267/65 R |
| 1002205 | 8/1965 | United Kingdom . |
| 1017555 | 1/1966 | United Kingdom . |
| 1163134 | 9/1969 | United Kingdom . |
| 1178606 | 1/1970 | United Kingdom . |
| 1183855 | 3/1970 | United Kingdom . |
| 1245406 | 9/1971 | United Kingdom . |
| 1382250 | 1/1975 | United Kingdom . |

Primary Examiner—Edward R. Kazenske
Attorney, Agent, or Firm—Brumbaugh, Graves, Donohue & Raymond

[57] ABSTRACT

A gas spring in which a valve permits flow of a pressurized fluid between two compartments of a cylinder cavity separated by a piston for movement of a piston rod attached to the piston outward of the cavity while inward movement of the piston rod is normally blocked by a mechanism which responds to a predetermined, axial, inward force applied to the piston rod for releasing the same.

5 Claims, 3 Drawing Figures

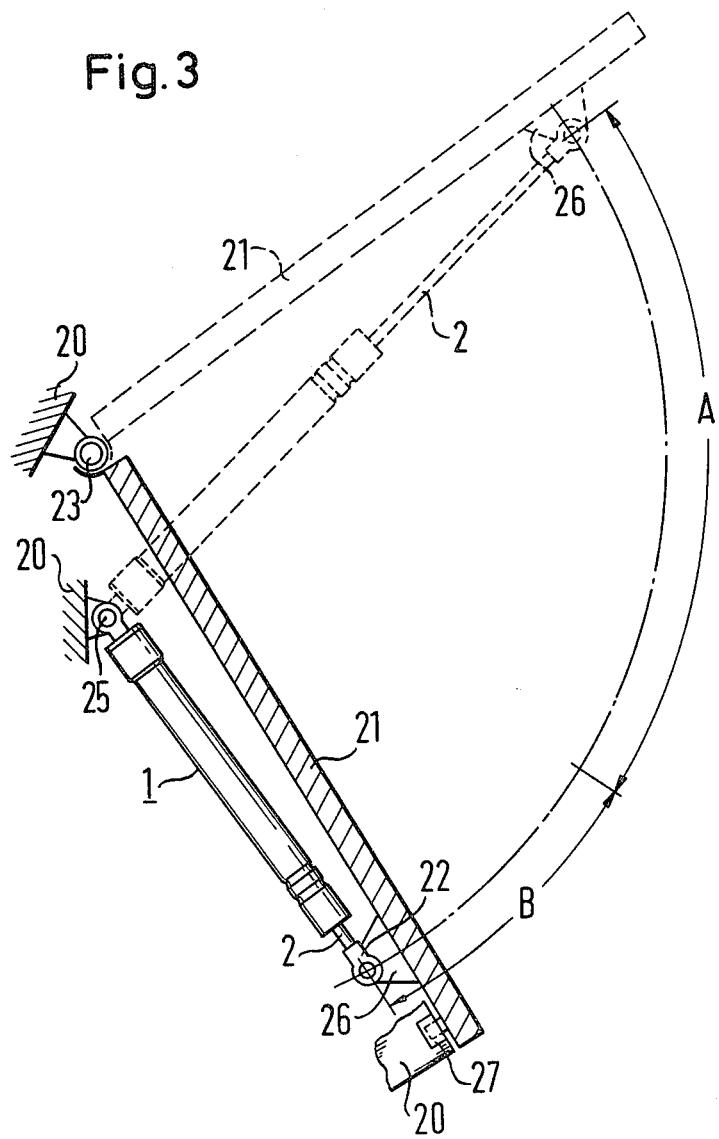

SELF-BLOCKING GAS SPRING RELEASED BY EXTERNAL FORCE

This is a continuation of application Ser. No. 858,155 filed Dec. 7, 1977, now abandoned.

BACKGROUND FIELD OF THE INVENTION

This invention relates to gas springs and to their use for compensating a portion of the force of gravity acting on a movably mounted mass. In its more specific aspects, the invention is concerned with a gas spring compensating a portion of the weight of a closure member moved by gravity toward an aperture in the body of an automotive vehicle.

THE PRIOR ART

It is known to mount one or more gas springs between a vehicle body and a closure movable on the body about a horizontally extending axis for facilitating movement of the closure upward and away from a low position in which it closes an aperture in the body. Such closures include motor hoods, trunk lids, and rear windows on passenger cars and station wagons. It is necessary to provide devices which hold the closure in its rasied position, and it has been proposed in U.S. Pat. No. 3,938,793 to build a suitable blocking mechanism into the gas spring itself. The gas pressure in the known spring is not sufficient to hold the closure in the raised position, and the known blocking arrangement can be released only by moving the closure a small distance further away from the low position. This is inconvenient to users not familiar with the mechanism. Moreover, the known device does not permit blocking of the gas spring in intermediate positions between the low and raised positions.

SUMMARY

An important object of the invention is the provision of a gas spring which is self-blocking not only in the raised position of an associated closure, but in an infinite number of intermediate positions, and which may be released by an external force applied in a direction to move the closure toward the low position.

With these and other objects in view, the invention, in one of its aspects, provides a gas spring whose cylinder has an axis and bounds a sealed cavity therein. A piston rod is axially movable inward and outward of the cavity and carries a piston in the cavity which is separated into first and second compartments by the piston. A body of fluid under a pressure higher than atmospheric pressure is sealed in the cavity for biasing the piston rod axially outward of the cavity. A valve arrangement is operatively interposed between the compartments for connecting the same in response to outward movement of the piston rod from the cavity. A blocking mechanism normally blocks movement of the piston rod inward of the cavity, but reponds to a predetermined force applied to the piston rod in a direction inward of the cavity for releasing the piston rod.

In another aspect, the invention resides in a support, such as the body of an automotive vehicle, a mass, such as one of the closures mentioned above, mounted on the support for movement in a direction having a vertical component between a low position and a raised position. A portion of the force of gravity acting on the mass is compensated by at least one gas spring of the invention, and mounting devices mount the spring or springs between the mass and the support in such a manner that the piston rod moves outward of the cylinder cavity during movement of the mass from its low to its raised position and vice versa. The weight of the mass is sufficient for overcoming the biasing force of the body of fluid in the gas spring or springs during movement of the mass away from the raised position so that the closure is held by the blocking mechanism and released for downward movement by the afore-mentioned predetermined force.

BRIEF DESCRIPTION OF THE DRAWINGS

Other features, additional objects, and many of the attendant advantages of this invention will readily be appreciated as the same becomes better understood by reference to the following detailed description of preferred embodiments when considered in connection with the appended drawing in which:

FIG. 3 is a fragmentary, sectional side elevation of an automotive vehicle equipped with gas springs of FIGS. 1 or 2.

DETAILED DESCRIPTION

Figure 1:
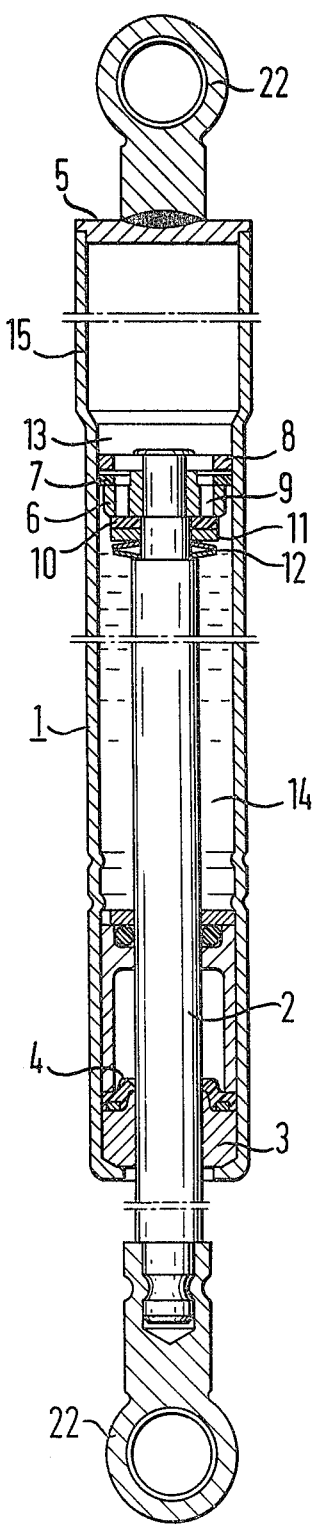
FIG. 1 shows a gas spring of the invention in elevational section.

Referring now to the drawing in detail, there is seen a gas spring including a cylinder 1 and a piston rod 2 movable axially into and out of the cylinder cavity through an annular end wall 3 of the cylinder and a sealing arrangement 4, conventional and not requiring more detailed description. Another, imperforate end wall 5 bounds the cylinder cavity in an axial direction away from the end wall 3.

A piston 6 is axially secured on the end of the piston rod 2 in the cylinder cavity. Its cross section is smaller than that of any axial portion of the cylinder 1, but it carries a piston ring 7 which slidably engages the cylinder wall in the illustrated piston position. The piston ring 7 is capable of limited axial movement between the piston 6 and an apertured retaining disc 8 fixedly fastened to the piston rod. The orifices of axial bores 9 in the piston 6 are sealed in the illustrated condition of the gas spring by a pressure relief valve including a somewhat resilient, annular plastic plate 10 backed by a rigid metal washer 11 and a stack of cup springs 12 axially interposed between the washer 11 and a shoulder of the piston rod 2.

The piston 6 axially separates a first compartment 13 of the cylinder cavity adjacent the end wall 5 from a second compartment 14 adjacent the end wall 3. A portion 15 of the cylinder wall contiguously adjacent the end wall 5 is radially enlarged to a diameter greater than that of the piston ring 7. The end wall 5 and the outer end of the piston rod 2 carry respective apertured mounting lugs 22.

The first compartment 13 is filled with air or nitrogen at a pressure of 100 to 200 lbs./sq. in. while the much larger second compartment 14 is filled with an oil, such as hydraulic brake fluid. The piston ring 7 functions as a one-way valve which, in the illustrated position, blocks flow of oil or gas between the compartments 13, 14. When the piston rod 2 moves outward of the cylinder cavity, friction between the piston ring 7 and the inner wall of the cylinder 1 as well as the resistance of the practically incompressible oil holds the piston ring 7 in its axial position until it is abuttingly engaged by the disc 8. Thereafter, oil can flow through the annular clearance gap between the piston 6 and the cylinder 1, the central opening of the piston ring 7, and the apertures in the disc 8. The additional space made available in the cylinder cavity of the outward movement of the piston rod 2 is occupied by the expanding gas cushion.

Movement of the piston rod 2 inward of the cylinder cavity from the illustrated position would be prevented by the gas in the compartment 13 whose pressure is not sufficient for overcoming the cup springs 12. If the gas spring is inverted so that the compartment 14 is above the compartment 13, liquid fills the entire compartment 13 and a portion of the compartment 14 above the piston 6 in a corresponding axial position of the piston, and the piston rod 2 is prevented from movement inward of the cylinder cavity by the incompressible liquid in the compartment 13 as long as the valve plate 10 blocks the orifices of the passages through the bores 9. If a sufficient inward force is applied to the piston rod 2, the pressure differential between the compartments 13, 14 becomes so great as to push the valve plate 10 away from the orifices of the bores 9, and the resulting flow of liquid from the compartment 13 into the compartment 14 permits the piston rod 2 to move toward the end wall 5.

The length of the enlarged cylinder portion 15 is greater than the combined axial length of the disc 8, the piston ring 7, the piston 6, the plate 10, the washer 11, and the spring 12. The piston rod 2 thus reaches a position during its inward movement in which a wide open annular by-pass is formed between the cylinder portion 15 and the piston assembly. The piston rod 2 then can continue its movement into the terminal position adjacent the end wall 5 under a minimal driving force only sufficient for overcoming friction in the sealing arrangement 4 and the gas pressure in the cylinder 1.

Figure 2:
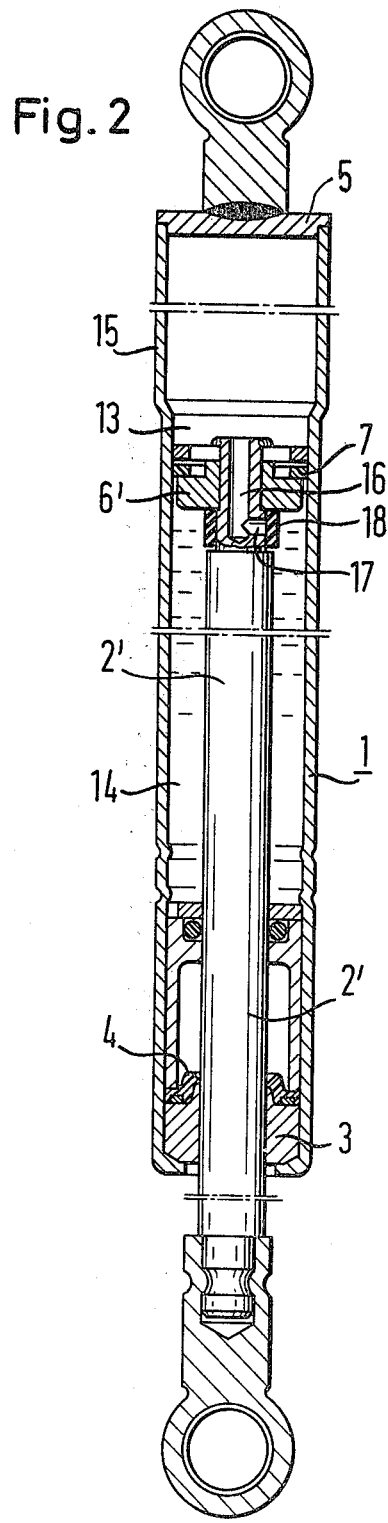
FIG. 2 illustrates another gas spring of the invention in the manner of FIG. 1.

The modified gas spring illustrated in FIG. 2 differs from that described above in detail by its piston rod 2' and piston 6'. An axial bore 16 in the piston rod 2' has an orifice in the compartment 15, and a connected radial bore 17 has an orifice in the compartment 14 closely adjacent the piston 6' which lacks the bores 9 of the piston 6. A short cylindrical sleeve 18 of oil-resistant rubber is axially secured between the piston 6' and a shoulder of the piston rod 2', and the resilient tension of the entire sleeve holds a circumferential portion of the sleeve 18 in sealing contact with the orifice of the radial bore 17. The sleeve 18 thus replaces the valve plate 10, washer 11, and springs 12 of the gas spring shown in FIG. 1 with which the spring of FIG. 2 is identical as far as not described otherwise. There is no qualitative difference in the mode of operation.

FIG. 3 shows only as much of an otherwise conventional motor vehicle as is needed for an understanding of this invention. Only three portions of the vehicle body 20 are seen. Two of the illustrated portions bound an aperture closed by a lid 21 in the condition of the apparatus illustrated in fully drawn lines. The aperture gives access to non-illustrated trunk space in the body 20. The lid 21 is mounted on hinges 23 whose common axis is horizontal and perpendicular to the normal direction of vehicle movement.

Two gas springs of the type shown in FIGS. 1 or 2 are mounted near the rear ends of the side walls of the car body 20, one spring being obscured by the identical second spring. The cylinder 1 of each spring is attached to the car body below the axis of the hinges 23 by a pivot pin 25 which engages the mounting lug on the cylinder, while the mounting lug 22 on the piston rod 2 is pivotally fastened to a bracket 26 on the lid 21 remote from the hinges 23. When the lid 21 is swung from the low position to the raised position shown in broken lines, the mounting lug 22 travels in an arc indicated by a chain dotted line, and the piston rod 2' moves outward of the cavity in the cylinder 1.

The gas pressure in the two springs is selected in such a manner that it cannot counterbalance the force of gravity acting on the lid 21. As long as fluid can flow between the compartments 13, 14 of each spring, the lid 21 would return to the fully drawn low position by gravity alone. However, the force exerted by the compressed gas on the piston rods 2 partly compensates the weight of the lid 21, and little manual effort is required for lifting the lid against the residual gravity and the viscous resistance of fluid flowing from the compartment 14 into the compartment 13 through the flow path opened by the piston ring 7. When the lid, thereafter, is released from manual pressure, it moves downward a distance too small to permit pictorial representation on the scale of FIG. 3 and is then stopped after the piston ring 7 reverts to the position shown in FIGS. 1 and 2. The lid 21 may thus be arrested in any position within an arc A which extends downward from the raised position.

To release the lid, enough manual downward pressure is applied that the resulting inward force acting on the piston rod 2 generates a pressure differential between the compartments 13, 14 which overcomes the resistance of the cup springs 11 or of the sleeve 18 in the manner described with reference to FIGS. 1 and 2. The springs 11 and sleeve 18 are chosen relative to the mass of the lid 21 in such a manner that they permit fluid flow from the compartment 13 into the compartment 14 when the manually applied, downward force is quite small, smaller than the force of gravity acting on the lid 21, the combined forces thus being smaller than twice the force of gravity.

When the piston 6,6' approaches the end wall 5, it enters the enlarged cylinder portion 15, and the mass of the lid 21 alone is sufficient for moving the lid through an arc B into its low or closed position in which it may be fastened by a lock 27, the blocking mechanism being inactivacted.

The spring arrangement shown in FIG. 3 with reference to a trunk lid may be used without significant change in connection with a hood on the motor compartment, a rear window or hatch on the body of a passenger car, or the corresponding elements of a motorboat or airplane, other examples of automotive vehicles. However, the gas spring arrangement is not limited in its application to such vehicles and may be useful wherever a mass is mounted on a support for movement in a direction having a vertical component.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A gas spring arrangement comprising:
 (a) a cylinder having an axis and bounding a sealed cavity with first and second ends therein, an end region being provided at the first end of said cavity;

(b) a piston rod member extending from the second end of said cavity and being axially movable inward and outward of said cavity;

(c) a piston member mounted in said cavity on said piston rod member for movement therewith and axially separating said cavity into a first, inward compartment and a second, outward compartment, said piston member having a diameter smaller than the diameter of the cavity outside the end region;

(d) a body of fluid under a pressure higher than atmospheric pressure sealed in said cavity for acting on said piston member to bias said piston rod member axially outward of said cavity, the diameter of the piston member being small enough to create an annular space between it and the cylinder outside said end region sufficient to allow the passage of said fluid;

(e) valve means operatively interposed between said compartments for connecting the same in response to outward movement of said piston rod member from said cavity, said valve means including an annular disc mounted to the piston member and a piston ring mounted between the disc and piston member for limited axial movement such that movement of the piston rod into the cavity causes the piston ring to block and seal the annular space between the piston member and the cylinder, while movement out of the cavity causes the piston ring to unseal the annular space;

(f) blocking means for blocking movement of said piston rod member inward of said cavity and responding to a predetermined axial force applied to said piston rod member in a direction inward of said cavity for releasing said piston rod member for said movement inward of said cavity, said blocking means including (1) means defining an axial passage in said piston rod member extending from the end of the rod in the first compartment to just beyond the piston member in the second compartment and remaining continuously open to said first compartment, (2) a radial passage extending from the axial passage to the second compartment so as to provide the only connection between said first and second compartments during inward movement of said piston rod and (3) pressure-relief valve means for closing said radial passage in the absence of a fluid pressure differential between said compartments generated by said predetermined force and for opening said passage in the presence of said fluid pressure differential, said pressure-relief valve being in the form of a resilient sleeve surrounding said piston rod at the location of said radial passage and yieldably closing said radial passage.

2. An arrangement as claimed in claim 1 further including a support and a mass mounted on said support for movement, in a direction having a vertical component, between a low position and a raised position, whereby the force of gravity acting on said mass biases said mass toward said low position, the cylinder and piston rod of said gas spring being mounted between said support and said mass, the piston rod being moved into the gas spring cavity during movement of said mass from its raised position to said low position, said force of gravity being sufficient for overcoming the biasing force of the body of fluid of the gas spring during said downward movement.

3. A structure as set forth in claim 2, wherein said predetermined force is smaller than said force of gravity.

4. An arrangement as set forth in claim 2, wherein said support is the body of an automotive vehicle and is formed with an aperture, and said mass in said low position thereof closes said aperture, said aperture being open in said raised position of said mass.

5. An arrangement as claimed in claim 1, wherein said end region has a diameter larger than the rest of said cavity and an axial length longer than the length of the piston member and valve means, the diameter of said end region being such as to create a fluid bypass space between the piston ring and the cylinder that cannot be blocked by said piston ring.

* * * * *

UNITED STATES PATENT AND TRADEMARK OFFICE
CERTIFICATE OF CORRECTION

PATENT NO. : 4,307,875
DATED : December 29, 1981
INVENTOR(S) : Klaus Schnitzius and Herbert Freitag It is certified that error appears in the above—identified patent and that said Letters Patent is hereby corrected as shown below:

- On The Title Page, item (56) insert

-- 3,865,356    2/1975    Wossner    --.

Col. 1, line 7, "BACKGROUND" and "FIELD OF THE INVENTION" should be centered on separate lines;

Col. 1, line 26, "rasied" should read --raised--;

Col. 3, line 5, "cavity of" should read --cavity by--;

Col. 4, line 6, "2'" should read --2--.

Signed and Sealed this

Sixth Day of July 1982

[SEAL]

Attest:

GERALD J. MOSSINGHOFF

Attesting Officer

Commissioner of Patents and Trademarks